United States Patent
Murakami et al.

(10) Patent No.: US 11,511,890 B2
(45) Date of Patent: Nov. 29, 2022

(54) FLIGHT STATUS INSPECTION SYSTEM, FLIGHT STATUS INSPECTION METHOD, AND NON-TRANSITORY COMPUTER-READABLE RECORDING MEDIUM STORING PROGRAM

(71) Applicant: HONDA MOTOR CO., LTD., Tokyo (JP)

(72) Inventors: Hideo Murakami, Wako (JP); Yoshitaka Minagawa, Wako (JP); Ayatoshi Yokokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 16/970,410

(22) PCT Filed: Feb. 7, 2019

(86) PCT No.: PCT/JP2019/004345
§ 371 (c)(1),
(2) Date: Aug. 17, 2020

(87) PCT Pub. No.: WO2019/163523
PCT Pub. Date: Aug. 29, 2019

(65) Prior Publication Data
US 2021/0114750 A1    Apr. 22, 2021

(30) Foreign Application Priority Data
Feb. 23, 2018  (JP) .............................. JP2018-030791

(51) Int. Cl.
*B64F 5/60* (2017.01)
*G01D 21/02* (2006.01)
*G05D 1/08* (2006.01)

(52) U.S. Cl.
CPC ............... *B64F 5/60* (2017.01); *G01D 21/02* (2013.01); *G05D 1/0808* (2013.01)

(58) Field of Classification Search
CPC .......... B64F 5/60; G01D 21/02; G05D 1/0808
See application file for complete search history.

(56) References Cited

U.S. PATENT DOCUMENTS 9,753,461 B1    9/2017  Johnson et al.
2013/0173224 A1  7/2013  Santerre et al.
2016/0246304 A1*  8/2016  Canoy .................. G05D 1/0816

FOREIGN PATENT DOCUMENTS

CN    105083588    11/2015
CN    106494640     3/2017
(Continued)

OTHER PUBLICATIONS

International Search Report and Written Opinion for International Application No. PCT/JP2019/004345 dated Apr. 23, 2019, 10 pages.
(Continued)

*Primary Examiner* — Vivek D Koppikar
*Assistant Examiner* — Jeffrey R Chalhoub
(74) *Attorney, Agent, or Firm* — Amin, Turocy & Watson, LLP

(57) ABSTRACT

A flight status inspection system, flight status inspection method and non-transitory computer-readable recording medium storing program inspect the flight status of a flying object (drone) capable of flying through the air. The drone has a gravitational center movement device for moving the position of the gravitational center of the entire drone. In addition, the flight status inspection system has an inspection device for acquiring and storing information about the flight status when moving the position of the gravitational center of the drone during flight, or when changing the flight
(Continued)

details during movement of the gravitational center of the drone.

7 Claims, 8 Drawing Sheets

(56) References Cited

FOREIGN PATENT DOCUMENTS

| | | |
|---|---|---|
| CN | 107512405 | 12/2017 |
| CN | 207300535 | 5/2018 |
| EP | 2962936 | 1/2016 |
| FR | 3036381 | 11/2016 |
| JP | 2006-082775 | 3/2006 |
| JP | 2006082775 A * | 3/2006 |
| JP | 2006-193027 | 7/2006 |
| JP | 2017-132461 | 8/2017 |
| JP | 2017-174326 | 9/2017 |

OTHER PUBLICATIONS

Extended European Search Report for European Patent Application No. 19757142.5 dated Mar. 23, 2021.

* cited by examiner

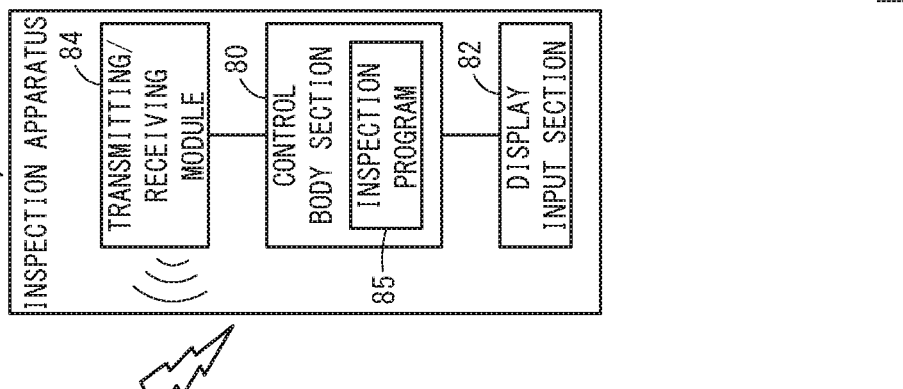
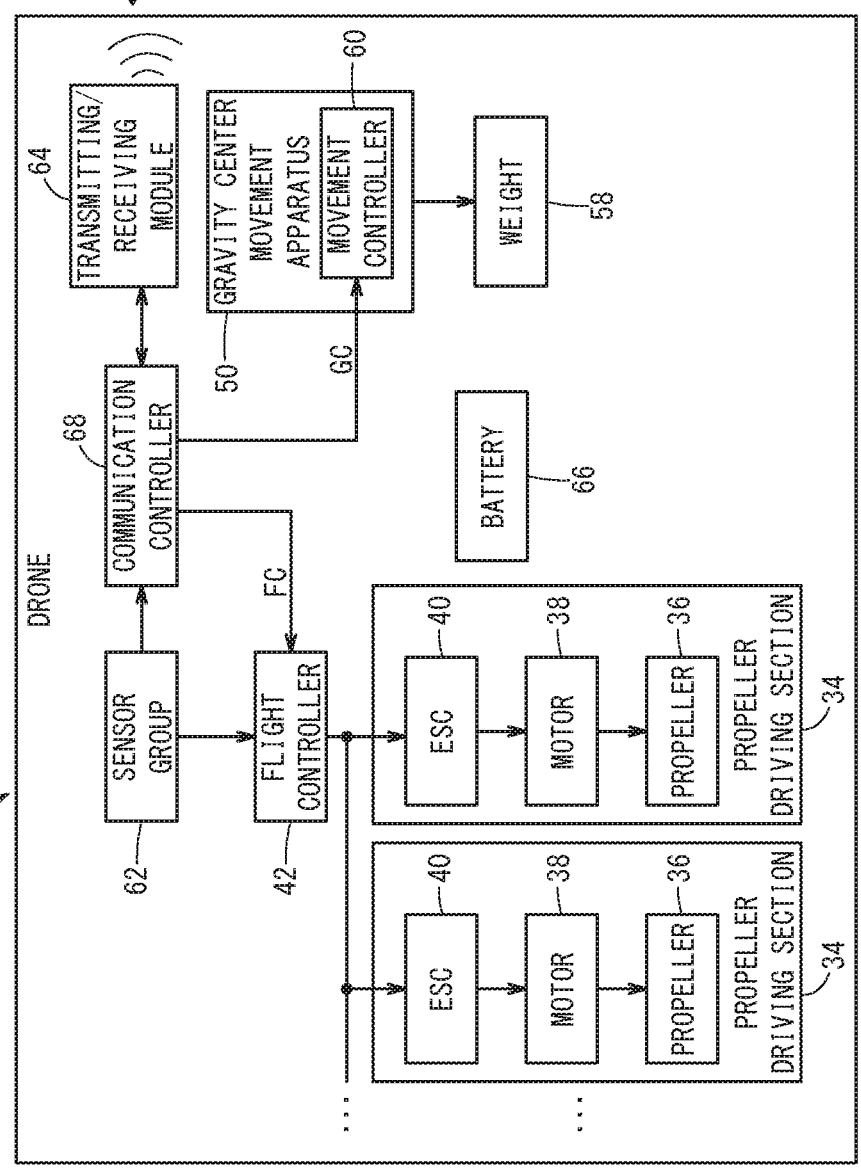
FIG. 3

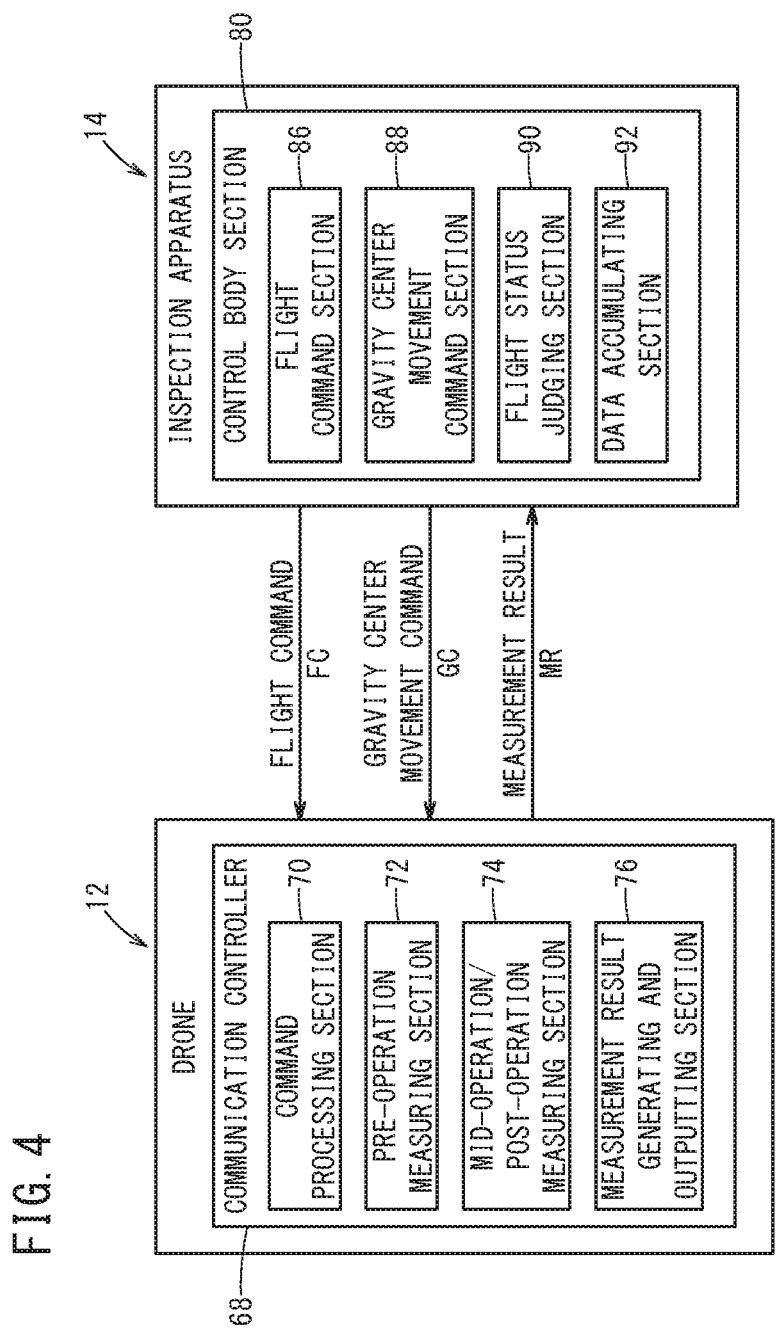

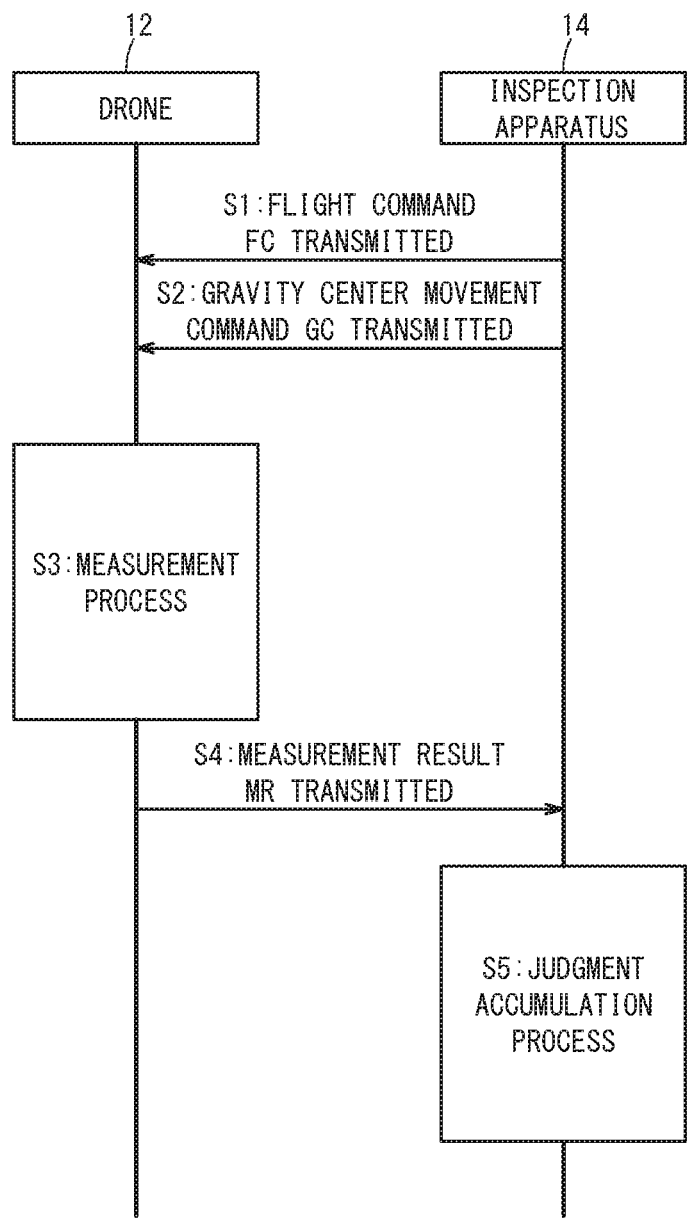

FLIGHT STATUS INSPECTION SYSTEM, FLIGHT STATUS INSPECTION METHOD, AND NON-TRANSITORY COMPUTER-READABLE RECORDING MEDIUM STORING PROGRAM

TECHNICAL FIELD

The present invention relates to a flight status inspection system, a flight status inspection method, and a non-transitory computer-readable recording medium storing a program for inspecting the flight status of a flying body.

BACKGROUND ART

In recent years, development has been progressing of flying bodies that can easily fly through the air. In this development, it is necessary to inspect the flight status during flight in order to realize stable flight for the flying body. For example, Japanese Laid-Open Patent Publication No. 2006-082775, Japanese Laid-Open Patent Publication No. 2017-132461, and Japanese Laid-Open Patent Publication No. 2017-174326 each disclose an inspection system for checking or evaluating the safety of the flight status by detecting the flight status of the flying body with a sensor or the like.

SUMMARY OF INVENTION

During flight, when the position of the center of gravity of the overall flying body including loaded objects moves, this has a large effect on the flight control. For example, if the center of gravity moves in a direction orthogonal to a movement direction of the flying body, not only does the movement direction of the flying body change, but there can be cases where the posture of the flying body is flipped.

However, conventionally, the inspection is performed on the assumption that only a small and light-weight loaded object, such as a camera, is loaded on the flying body. For example, in the inspection system disclosed in each of Japanese Laid-Open Patent Publication No. 2006-082775, Japanese Laid-Open Patent Publication No. 2017-132461, and Japanese Laid-Open Patent Publication No. 2017-174326, it is impossible to perform an inspection of the flight status when the center of gravity of the flying body has moved.

In the recent development of flying bodies, tests such as loading heavy objects in the flying body or loading people in the flying body are being performed, and in these cases, it is necessary to inspect the flight status of the flying body when the position of the center of gravity moves during flight.

The present invention has been made in view of the above circumstance and it is an objective of the present invention to provide a flight status inspection system, a flight status inspection method, and a non-transitory computer-readable recording medium storing a program that can easily inspect the flight status when the position of the center of gravity of a flying body moves, and encourage improvements in the safety and development efficiency of flying bodies.

In order to achieve this objective, the present invention is a flight status inspection system that inspects a flight status of a flying body capable of flying through air, wherein the flying body includes a gravity center movement apparatus configured to move a gravity center position of the overall flying body, and the flight status inspection system comprises an inspecting section configured to acquire and store information concerning the flight status when movement of the gravity center position is implemented during flight of the flying body, or when flight content is changed during gravity center movement of the flying body.

The inspecting section may be a computer that is formed separately from the flying body and connected in a manner enabling information communication with the flying body, and the inspecting section may transmit a flight command and/or a gravity center movement command to the flying body, and receives the information concerning the flight status when the flying body operates based on the flight command and/or the gravity center movement command.

The inspecting section preferably acquires the information concerning the flight status before the gravity center position is moved during flight of the flying body or before the flight content is changed during the gravity center movement of the flying body.

The inspecting section may acquire the information concerning the flight status during and/or after implementation of the movement of the gravity center position during flight of the flying body, or during and/or after changing of the flight content during the gravity center movement of the flying body.

The inspecting section preferably includes a judging section configured to judge whether a prescribed value included in the information concerning the flight status is within a predetermined tolerable range, based on the acquired information concerning the flight status.

The information concerning the flight status may include at least one of a posture, a position, an acceleration, and a velocity of the flying body during flight.

In order to achieve the objective described above, the present invention is a flight status inspection method for inspecting a flight status of a flying body capable of flying through air, wherein the flying body includes a gravity center movement apparatus configured to move a gravity center position of the overall flying body, and the flight status inspection method comprises acquiring and storing, with an inspecting section, information concerning the flight status when movement of the gravity center position is implemented during flight of the flying body, or information concerning the flight status when flight content is changed during gravity center movement of the flying body.

In order to achieve the objective described above, the present invention is a non-transitory computer-readable recording medium storing a program for an inspection apparatus that inspects a flight status of a flying body capable of flying through air, wherein the flying body includes a gravity center movement apparatus configured to move a gravity center position of the overall flying body, and the program causes the inspection apparatus to function as an inspecting section configured to acquire and store information concerning the flight status when movement of the gravity center position is implemented during flight of the flying body, or information concerning the flight status when flight content is changed during gravity center movement of the flying body.

According to the flight status inspection system, the flight status inspection method, and the non-transitory computer-readable recording medium storing the program according to the present invention, the inspecting section acquires and stores information concerning the flight status of the flying body when movement of the total gravity center position is implemented during the flight of the flying body, or when the flight content is changed during the gravity center movement of the flying body. In this way, it is possible to measure the flight status that accompanies the gravity center movement of the flying body. In other words, by performing gravity center movement of the flying body, it is possible to simulate various flight environments such as changes in the gravity centers of loaded objects and changes in posture caused by external disturbances. As a result, in a test or the like of the flight status of the flying body, it is possible to implement an inspection in accordance with the actual situation and intended purpose, and to encourage the improvement of the development efficiency, safety, and the like of the flying body.

As an example, in a case where a flying body planned for development is a boarding type onto which a person boards, even if a person is not actually boarded thereon, it is possible to inspect the flight status of the flying body in a situation equivalent to a case where a person is boarded thereon (posture change caused by body weight movement or the like). Alternatively, in a case where a flying body planned for development is a loading type onto which heavy objects (baggage) are loaded, even if heavy objects are not actually loaded thereon, it is possible to inspect the flight status of the flying body in a situation equivalent to a case where heavy objects are loaded thereon (gravity center position change caused by movement of the baggage or the like).

BRIEF DESCRIPTION OF DRAWINGS

FIG. 3 is a block diagram showing the configuration of each of an inspecting section and the flying body of FIG. 1;

FIG. 4 is a function block diagram during inspection of the flight status of the flying body;

FIG. 5 is a flow chart showing a flight status inspection method performed by the flight status inspection system;

DESCRIPTION OF EMBODIMENTS

The following describes in detail preferred embodiments of the present invention, while referencing the accompanying drawings.

First Embodiment

Figure 1:
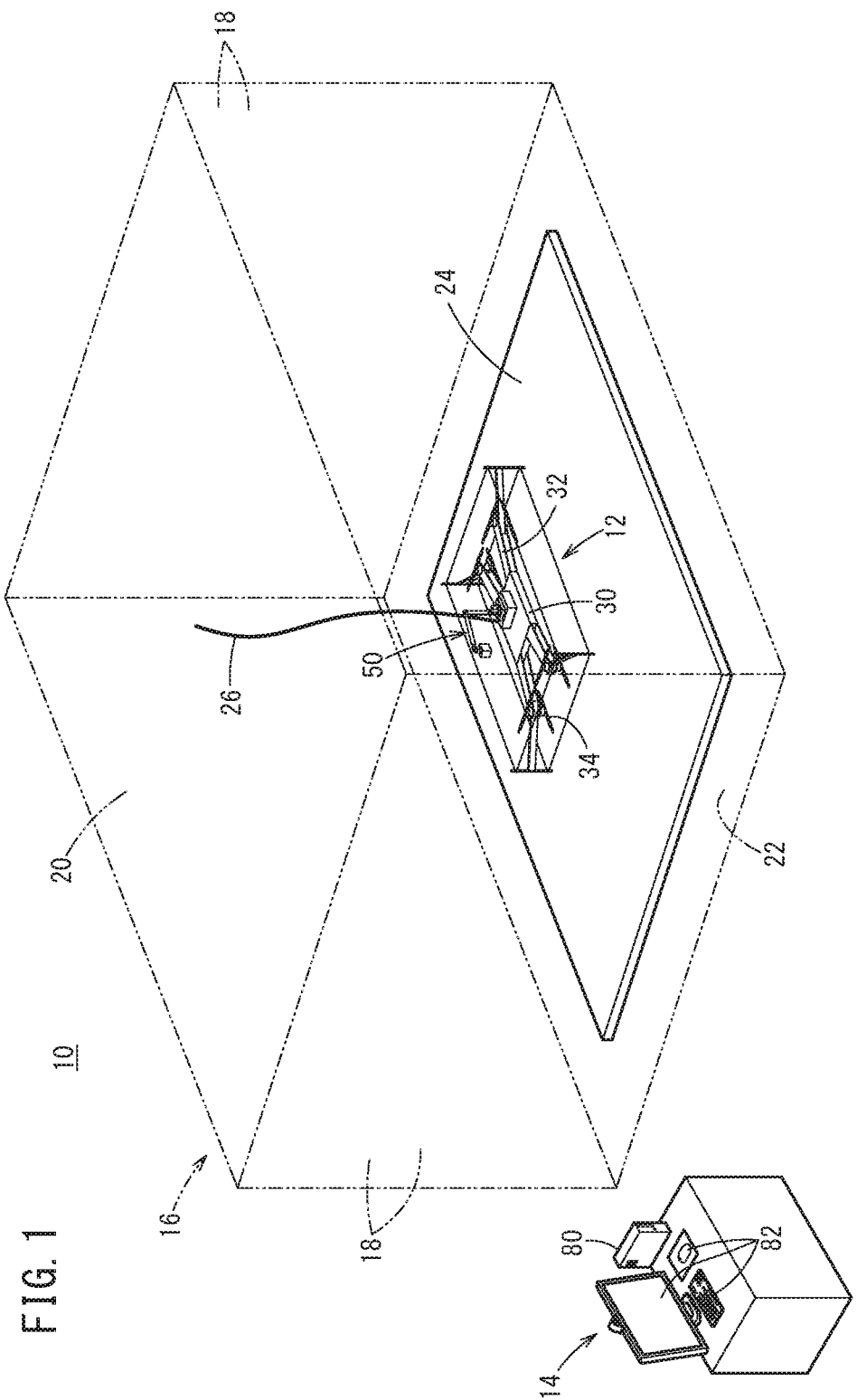
FIG. 1 is a perspective view schematically showing the overall configuration of a flight status inspection system according to a first embodiment of the present invention.

As shown in FIG. 1, a flight status inspection system 10 according to a first embodiment of the present invention includes a flying body 12 (referred to below as a drone 12) that is an inspection target, and an inspection apparatus 14 (inspecting section) that inspects the flight status of the drone 12. The drone 12 is configured such that the center of gravity position (position in three-dimensional space) of the overall drone 12 including loaded objects moves independently from positional change caused by flying. The flight status inspection system 10 causes the center of gravity of the drone 12 to move during flight and inspects the flight status of the drone 12. The drone 12 can be configured to be a boarding type onto which a person can board or a loading type onto which heavy objects can be loaded.

Furthermore, the flight status inspection system 10 sets a space (referred to below as a planned flight space 16) in which the drone 12 is planned to fly during the inspection. The planned flight space 16 is designed to be a range in which the drone 12 and the inspection apparatus 14 can accurately perform wireless communication. The planned flight space 16 is preferably set to have a large volume enabling the drone 12 to fly a sufficient distance.

In the present embodiment, the planned flight space 16 is set inside a room in a building, in order to suppress the change in the flight status caused by elements (disturbances by wind or the like) other than movement of the center of gravity of the drone 12 as much as possible. In this room in the building, screens 18 are set up to surround a space in four directions, and the planned flight space 16 is set in a range surrounded by a ceiling 20 and a floor 22 of this building within the region defined by these screens 18. The inspection apparatus 14 is prevented from contacting the drone 12 by being arranged outside the screens 18 (planned flight space 16).

The screens 18 may be formed by wire mesh or the like, for example, and may be formed in a manner to not inhibit wireless communication between the drone 12 and the inspection apparatus 14. Furthermore, a cushion 24 that absorbs the impact when the drone 12 lands is provided on the floor 22 forming the planned flight space 16. The cushion 24 may be attached to the screens 18 or the ceiling 20.

The planned flight space 16 is formed with a rectangular shape in the present embodiment, but the shape of the planned flight space 16 is not particularly limited. Furthermore, in order to check the behavior during a disturbance, the flight status inspection system 10 may include a disturbance generation apparatus (not shown in the drawings) such as fan or may set the planned flight space 16 to be outside the building.

A cord 26 for connecting the drone 12 is fixed to the approximate center of the ceiling 20 forming the planned flight space 16. This cord 26 prevents the drone 12 from flying sideways to the outside of the planned flight space 16. The cord 26 may be provided on the floor 22, or may be provided on both the ceiling 20 and the floor 22. The cord 26 may be formed as a cable that connects the inspection apparatus 14 and the drone 12 in a manner enabling wired communication.

In the flight status inspection system 10, the flight commands and gravity center movement commands are transmitted from the inspection apparatus 14 to the drone 12, to control the flight and gravity center movement of the drone 12. The inspection apparatus 14 is configured to receive information (referred to below as measurement results) concerning the flight status of the drone 12 at this time, store these measurement results, analyze the flight status, and judge the acceptability of the flight status.

Figure 2:
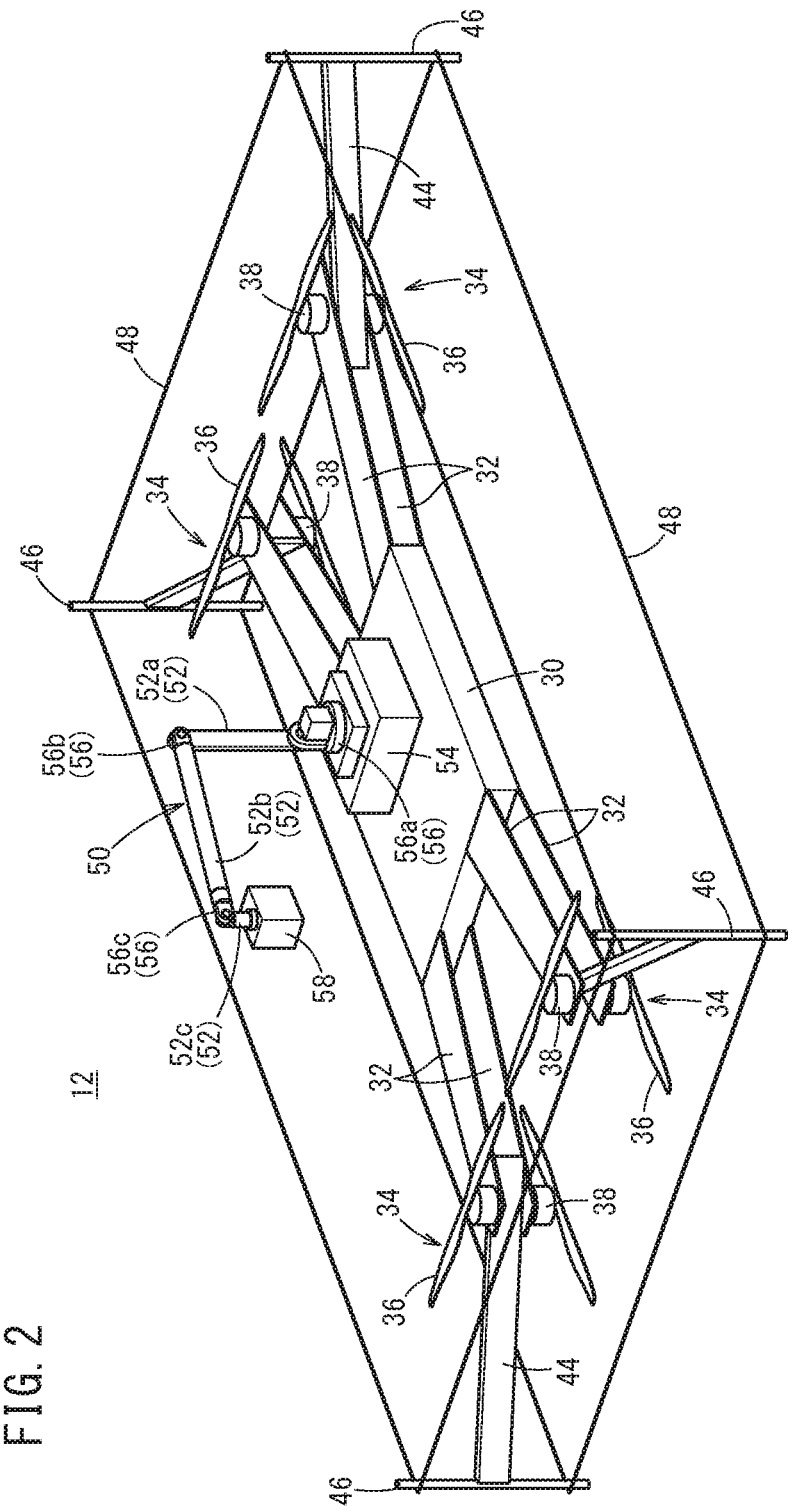
FIG. 2 is a perspective view of a flying body capable of implementing gravity center movement.

The following describes an example of the drone 12 applied to the flight status inspection system 10, while referencing FIGS. 2 and 3. The drone 12 of the present embodiment has an overall rectangular shape. For the sake of convenience in the following description, one end side of the drone 12 in the longitudinal direction is referred to as a front end, and the other end side of the drone 12 in the longitudinal direction is referred to as the rear end. It is obvious that the drone 12 can fly three-dimensionally (ascending direction, descending direction, front-end direction, rear-end direction, and both side directions) due to a propeller driving section 34 described further below.

The drone 12 includes a main body 30, a plurality of extension frames 32 that extend from the sides of the main body 30, and propeller driving sections 34 provided to the plurality of extension frames 32. In the present embodiment, a total of eight extension frames 32 are provided, protruding as a top and bottom pair from each of the four corners of the box-shaped main body 30. A total of eight propeller driving sections 34 are provided corresponding one-to-one to the plurality of extension frames 32. The number and arrangements of the propeller driving sections 34 provided to the drone 12 are not particularly limited, and as an example, a configuration may be used in which the top-side frames among the eight extension frames 32 are each provided with one propeller driving section 34 (total of four propeller driving sections 34).

Each propeller driving section 34 includes a propeller 36, a motor 38 for rotating the propeller 36, and an ESC 40 that controls driving of the motor 38. Each propeller 36 is formed with a long and thin plate shape extending linearly, and the center portion thereof in the longitudinal direction is fixed to a shaft portion (not shown in the drawing) of the motor 38. Each motor 38 is fixed to the top surface of the top-side extension frame 32 or the bottom surface of the bottom-side extension frame 32, with the shaft portion thereof protruding in a direction orthogonal to the extension direction of the extension frame 32. Each ESC 40 is connected to a flight controller 42 provided in the main body 30 in a manner to be capable of transmitting signals and, under the control of the flight controller 42, controls the power supplied to the motors 38 to rotate the shaft portions of the motors 38.

The top and bottom propeller driving sections 34 fixed to the top and bottom extension frames 32 extending in the same direction are controlled to rotate in opposite directions from each other by the flight controller 42 when the drone 12 is flying stably. For example, when the top-side propeller 36 is made to rotate clockwise, the bottom-side propeller 36 is made to rotate counter-clockwise.

Furthermore, the top and bottom extension frames 32 extending in the same direction hold protective frames 44, which protrude farther from installation locations of the propeller driving sections 34, in a fixed manner. Four protective frames 44 extend farther outward than the propellers 36, and bars 46 having prescribed lengths (dimensions longer than the thickness of the main body 30) in the up-down direction are provided at the protruding ends of these protective frames 44. Wires 48 are stretched between respective top positions of the four bars 46 and between respective bottom positions of the four bars 46 in a manner to go around the bars 46. That is, the four bars 46 and the wires 48 define the boundary between the drone 12 and the outside, and prevent the propellers 36 and the main body 30 from colliding with the screens 18 around the planned flight space 16 while the drone 12 is flying.

A gravity center movement apparatus 50 (loaded body) that moves the gravity center position of the overall drone 12 during flight is attached to the main body 30 of the drone 12. In the present embodiment, the gravity center movement apparatus 50 is a robot arm fixed to the top surface of the main body 30, and is configured such that the gravity center position of the overall drone 12 (referred to below as the total gravity center position) is moved based on the operation of the robot arm. The installation position of the gravity center movement apparatus 50 is not particularly limited, and the gravity center movement apparatus 50 may be attached to the bottom surface of the main body 30, for example.

Specifically, the gravity center movement apparatus 50 includes a plurality of arms 52 (first to third arms 52a to 52c), a base platform 54 that supports the arms 52, and a plurality of joint portions 56 that connect the arms 52 to each other and to the base platform 54, in a manner to be rotatable with respect to each other. The joint portions 56 include a first joint portion 56a that connects the base platform 54 and the first arm 52a, a second joint portion 56b that connects the first arm 52a and the second arm 52b, and a third joint portion 56c that connects the second arm 52b and the third arm 52c.

Among the plurality of arms 52, the third arm 52c is configured to be capable of moving farthest away relative to the base platform 54 and to be a hand portion that holds a weight 58. The three-dimensional position of the weight 58 is changed according to the movement of the first to third arms 52a to 52c. This weight 58 may be designed to have any weight capable of easily moving the gravity center position of the overall drone 12.

Among the plurality of joint portions 56, the first joint portion 56a is capable of rotating 360° in a planar direction of the base platform 54, and of moving the first arm 52a in a manner to trace a semicircle from the plane of the base platform 54, in the planar view of the drone 12. Each of the first to third joint portions 56a to 56c is provided with a servo motor (not shown in the drawings), and each servo motor has its pivoting controlled by a movement controller 60 provided inside the base platform 54.

The movement controller 60 is configured as a computer that includes a processor, a memory, and an input/output interface. The movement controller 60 is connected to a communication controller 68 provided in the main body 30 of the drone 12, and controls the movement of the arms 52 (rotation of the first to third joint portions 56a to 56c) based on a gravity center movement command GC transmitted from the inspection apparatus 14. The movement controller 60 may include an operating procedure program that causes the gravity center movement apparatus 50 to operate, and may cause the gravity center movement apparatus 50 to operate automatically based on the execution of this operating procedure program.

At the timing when the flight of the drone 12 is started, the gravity center movement apparatus 50 sets a reference position such that the total gravity center position of the drone 12 itself and the gravity center movement apparatus 50 including the weight 58 is located at the center position of the rectangular drone 12. Then, when implementing the gravity center movement, the movement controller 60 causes the gravity center movement apparatus 50 to operate (move the weight 58 with the robot arm) such that the total gravity center position moves to a position corresponding to the gravity center movement command GC. A velocity (time) is preferably set in the gravity center movement command GC for moving the total gravity center position, and the movement controller 60 changes the total gravity center position in accordance with this velocity. In this way, the gravity center movement apparatus 50 makes it possible to measure the flight status of the drone 12 in accordance with not only the movement amount of the total gravity center position, but also with the movement velocity.

The gravity center movement apparatus 50 may be capable of implementing various types of movement for the gravity center movement of the total gravity center position. For example, in addition to moving the total gravity center position in a prescribed direction in a three-dimensional space, the gravity center movement apparatus 50 may perform operations such as moving the total gravity center position back and forth, vibrating the total gravity center position with a short period, and making the total gravity center position go around the main body 30. Furthermore, the gravity center movement apparatus 50 is not limited to being a robot arm and can adopt various configurations, and may have a configuration including a rail and a slider that moves along the rail, for example.

As shown in FIG. 3, in addition to the flight controller 42, a sensor group 62 that detects the flight status, a transmitting/receiving module 64 capable of performing information communication with the outside, a battery 66 for supplying power, and the communication controller 68 that processes the communication information are provided inside the main body 30 of the drone 12. The drone 12 may include a control section in which the flight controller 42, the movement controller 60 of the gravity center movement apparatus 50, and the communication controller 68 are integrated.

The sensor group 62 includes a plurality of types of detectors that detect the flight status of the drone 12 and output this detection information to the flight controller 42 and the communication controller 68. Examples of the detectors in the sensor group 62 include a gyro sensor (angular acceleration sensor or angular velocity sensor), GPS device, acceleration sensor, velocity sensor, distance sensor, altitude sensor, camera, and the like. In other words, the detection information output by the sensor group 62 is the posture (angular acceleration or angular velocity), position information, acceleration, velocity, downward distance, altitude, and the like of the drone 12.

The flight controller 42 is configured as a computer, in the same manner as the movement controller 60. The flight controller 42 causes the drone 12 to fly by individually controlling the rotational driving of the plurality of (eight) propeller driving sections 34, based on a flight command FC transmitted from the inspection apparatus 14. Furthermore, the flight controller 42 acquires the detection information of the sensor group 62 during flight of the drone 12 and autonomously controls the flight status according to the detection information. The flight controller 42 may be configured to perform the flight autonomously, without depending on a flight command FC, by storing flight content in advance in a memory.

The transmitting/receiving module 64 forms a wireless communication line with the inspection apparatus 14, and transmits and receives information to and from the inspection apparatus 14 and the communication controller 68. The battery 66 is connected to the propeller driving sections 34 (ESCs 40), the flight controller 42, each detector of the sensor group 62, the transmitting/receiving module 64, the communication controller 68, and the gravity center movement apparatus 50, and suitably supplies the power necessary for operation.

The communication controller 68 is configured as a computer, in the same manner as the movement controller 60, and controls communication performed by the transmitting/receiving module 64. The communication controller 68 receives the flight command FC and the gravity center movement command GC transmitted from the inspection apparatus 14 via the transmitting/receiving module 64, and transmits measurement results MR of the flight status of the drone 12 to the inspection apparatus 14 via the transmitting/receiving module 64.

Furthermore, by having the processor execute a program (not shown in the drawings), the communication controller 68 forms function blocks for allocating commands and inspecting (acquiring) the flight status. Specifically, as shown in FIG. 4, a command processing section 70, a pre-operation measuring section 72, a mid-operation/post-operation measuring section 74, and a measurement result generating and outputting section 76 are formed.

The command processing section 70 distinguishes between flight commands FC and gravity center movement commands GC, among the commands received from the inspection apparatus 14. In the case of a flight command FC, the flight command FC is provided to the flight controller 42, and in the case of a gravity center movement command GC, the gravity center movement command GC is provided to the movement controller 60.

Furthermore, the command processing section 70 analyzes the flight command FC and the gravity center movement command GC, or the flight situation of the drone 12 and the total gravity center position, and judges whether a gravity center movement command GC has been issued during flight of the drone 12 or whether the flight command FC has changed during gravity center movement of the drone 12. Then, if a gravity center movement command GC has been issued during flight or the flight command FC has changed during the gravity center movement, the command processing section 70 implements the measurement of the flight status of the drone 12.

If the total gravity center position is moved during flight, the pre-operation measuring section 72, in conjunction with the movement controller 60, acquires the flight state of the drone 12 immediately before the implementation of this movement. Specifically, the pre-operation measuring section 72 acquires the detection information (also referred to as pre-implementation data) such as the posture, position, acceleration, and velocity immediately before the gravity center movement from the sensor group 62, and stores this detection information. Furthermore, if the flight content is changed during the gravity center movement, the pre-operation measuring section 72, in conjunction with the flight controller 42, acquires the flight status of the drone 12 immediately before the change.

On the other hand, if the total gravity center position is moved during flight, the mid-operation/post-operation measuring section 74 acquires and stores the flight status (detection information) of the drone 12 during the movement of the total gravity center position and/or until a prescribed time after this movement. Furthermore, if the flight content is changed during the gravity center movement, the mid-operation/post-operation measuring section 74 acquires and stores the flight status (detection information, also referred to as post-implementation data) of the drone 12 during the change of the flight content and/or until a prescribed time after this change. In this measurement performed by the mid-operation/post-operation measuring section 74, time is measured during the operation, the return time after the operation until the flight of the drone 12 has stabilized is measured, and these time measurements are stored in association with the detection information.

The measurement result generating and outputting section 76 extracts, as appropriate, detection information stored by the pre-operation measuring section 72 and the mid-operation/post-operation measuring section 74, and generates the data of a measurement result MR. Furthermore, the measurement result generating and outputting section 76 automatically transmits the generated measurement result MR to the inspection apparatus 14 at an appropriate timing. The flight status inspection system 10 is not limited to having a configuration in which the measurement result MR is transmitted in real time from the drone 12 to the inspection apparatus 14, and may have a configuration in which measurement results MR are accumulated until the drone 12 lands and, after landing, the measurements results MR are all transmitted together.

As shown in FIGS. 1 and 3, the inspection apparatus 14 of the flight status inspection system 10 is configured to transmit and receive information such as the flight commands FC, the gravity center movement commands GC, and the measurement results MR from outside the planned flight space 16 to the drone 12 inside the planned flight space 16. The inspection apparatus 14 includes a control body section 80 that is a computer, a display input section 82 (a keyboard or mouse and a display, touch panel, or the like) to be viewed and manipulated by an inspector (user), and a transmitting and receiving module 84 that forms a wireless communication line with the drone 12.

The control body section 80 forms a function section for inspecting the flight status of the drone 12, by reading and executing an inspection program 85 stored in a memory. Specifically, as shown in FIG. 4, a flight command section 86, a gravity center movement command section 88, a flight status judging section 90, and a data accumulating section 92 are formed within the control body section 80.

The flight command section 86 generates information of the flight content of the drone 12, as a flight command FC, based on manipulation by the user or a procedure registered in a program. The flight command section 86 then transmits the generated flight command FC to the drone 12, via the transmitting/receiving module 64.

The gravity center movement command section 88 generates information of the movement content of the gravity center movement apparatus 50, as a gravity center movement command GC, based on manipulation by the user or a procedure registered in a program. The gravity center movement command section 88 then outputs the generated gravity center movement command GC to the drone 12, via the transmitting/receiving module 64.

On the other hand, the flight status judging section 90 makes an acceptability judgment concerning the flight status of the drone 12, based on the measurement results MR transmitted from the drone 12. For example, the flight status judging section 90 has, in advance, a tolerable range corresponding to the flight situation of the drone 12, such as movement in, for example, the upward direction, the downward direction, the front-end direction, the rear-end direction, both side directions, and the yaw direction, and hovering.

The flight status judging section 90 sets the pre-implementation data, which was measured before the implementation of the gravity center movement (or before the change of the flight content), and is included in the measurement results MR, to be a reference value and adds the tolerable range to this reference value, thereby setting a threshold for the acceptability judgment. In addition to the detection information measured before the implementation of the gravity center movement, the flight status judging section 90 may set tolerable ranges for target values of the detection information included in the flight command FC and the gravity center movement command GC, for example.

As an example, the flight status judging section 90 sets the pre-implementation data concerning the posture, such as the pitch angle and roll angle, of the drone 12 during flight to be a posture reference value, and sets a tolerable posture range relative to this posture reference value. In the case of hovering, for example, the tolerable posture range may be a range of ±2° relative to the posture reference value.

Furthermore, the flight status judging section 90 sets the pre-implementation data concerning the position (GPS position information, downward distance, or altitude) of the drone 12 during flight to be a position reference value, and sets a tolerable position range relative to this position reference value. In the case of hovering, for example, the tolerable position range may be a range of ±20 cm relative to the position reference value.

Yet further, the flight status judging section 90 sets the pre-implementation data concerning the acceleration (or velocity) of the drone 12 during flight to be an acceleration reference value, and sets a tolerable acceleration range relative to this acceleration reference value. In the case of hovering, for example, the tolerable acceleration range may be a range of $±0.2$ m/s$^2$ relative to the acceleration reference value. Additionally, the flight status judging section 90 sets the pre-implementation data concerning the velocity of the drone 12 during movement to be a reference velocity limit value, and sets a tolerable velocity range relative to this reference velocity limit value.

The flight status judging section 90 compares the post-implementation data, which is the mid-operation and/or post-operation detection data (posture, position, velocity, acceleration, and the like) included in the measurement results MR to each tolerable range (acceptability judgment threshold value). If the post-implementation data is within the tolerable range in this comparison, it is judged that the implemented gravity center movement or flight content change does not significantly impair the flight status, i.e. that the flight status is acceptable. On the other hand, if the measurement result MR is outside the tolerable range, it is judged that the implemented gravity center movement or flight content change does significantly impair the flight status, i.e. that the flight status is unacceptable.

Yet further, the flight status judging section 90 may make a judgment based on the time included in the measurement results MR. For example, the flight status judging section 90 measures the return time, which is from a time before the gravity center movement to when the original posture, position, acceleration, or velocity has been returned to after a posture change, position change, acceleration change, or velocity change has occurred due to the gravity center movement. If this return time is within a predetermined elapsed time, the flight status judging section 90 judges that the gravity center movement implemented in an arbitrary flight situation does not significantly impair the flight status. On the other hand, if the return time exceeds the elapsed time, the flight status judging section 90 judges that the gravity center movement implemented in an arbitrary flight situation does significantly impair the flight status.

Upon acquiring a measurement result MR in a case where the gravity center has moved during flight of the drone 12 or a case where the flight content has changed during the gravity center movement, the data accumulating section 92 performs a process such as entering this measurement result MR into a database, and stores the database in a memory. At this time, the data accumulating section 92 stores, in addition to the flight status of the drone 12, the command content and the judgment result obtained by the flight status judging section 90 in association with each other.

In this way, by manipulating the display input section 82 of the inspection apparatus 14, the user of the inspection apparatus 14 can easily check the flight status accompanying the gravity center movement of the drone 12 and make a comparison with other measurement results MR.

The flight status inspection system 10 and the inspection program 85 according to the present embodiment are basically configured in the manner described above, and the following describes the process flow for performing an actual inspection (flight status inspection method).

As shown in FIG. 5, when inspecting the flight status of the drone 12, the flight status inspection system 10, in accordance with manipulation by the user, transmits a flight command FC from the inspection apparatus 14 to the drone 12 (step S1). The drone 12, upon receiving the flight command FC, transmits the flight command FC to the flight controller 42 using the communication controller 68. The flight controller 42 controls the driving of the propeller driving sections 34 based on the flight command FC, to control the drone 12 to the flight situation that is being commanded.

Then, in accordance with manipulation by the user, the inspection apparatus 14 transmits a gravity center movement command GC to the drone 12 (step S2). Due to this, the communication controller 68 of the drone 12 transmits the gravity center movement command GC to the gravity center movement apparatus 50, and preparation for moving the total gravity center position with the movement controller 60 is realized. Furthermore, the communication controller 68 prepares for measurement of the flight status at the time when the gravity center movement is implemented (including before the implementation). In the flight status inspecting method, the order of step S1 and step S2 may be reversed. Specifically, the flight content of the drone 12 can be changed during the gravity center movement by first outputting the gravity center movement command GC from the inspection apparatus 14 to the drone 12 to start or prepare for the implementation of the gravity center movement and then outputting the flight command FC from the inspection apparatus 14 to the drone 12. Furthermore, if an operation timing is indicated in the flight command FC and the gravity center movement command GC, the inspection apparatus 14 may transmit these commands simultaneously.

The communication controller 68 of the drone 12 implements the flight status measurement process after steps S1 and S2 (step S3). In this measurement process, processing is performed according to the process flow shown in FIG. 6A.

Specifically, in a case where the drone 12 performs gravity center movement in the various flight situations described above, the pre-operation measuring section 72 detects the flight status of the drone 12 immediately before the gravity center movement using the sensor group 62, and stores this detection information (pre-implementation data) (step S3-1). Furthermore, if the flight content is changed during the gravity center movement of the gravity center movement apparatus 50, the flight status before the change of the flight content is detected by the sensor group 62 and this detection information is stored.

Next, if the gravity center movement is performed during flight of the drone 12, the gravity center movement apparatus 50 is controlled by the movement controller 60 to move the total gravity center position in accordance with the gravity center movement command GC (step S3-2). Furthermore, if the flight situation is changed during the gravity center movement of the gravity center movement apparatus 50, the plurality of propeller driving sections 34 are controlled by the flight controller 42 to perform control such that the flight content in accordance with the flight command FC is achieved.

Then, during or after the implementation of step S3-2, the mid-operation/post-operation measuring section 74 detects the flight status of the drone 12 with the sensor group 62 and stores this detection information (step S3-3).

After the implementation of step S3-3, the measurement result generating and outputting section 76 extracts the flight status (pre-implementation data, post-implementation data) measured and stored by the pre-operation measuring section 72 and the mid-operation/post-operation measuring section 74, and generates information of a measurement result MR capable of being transmitted to the inspection apparatus 14 (step S3-4). In this way, the measurement process performed by the drone 12 is finished.

Returning to FIG. 5, when the measurement process (step S3) is finished, the drone 12 transmits the generated measurement result MR to the inspection apparatus 14 using the measurement result generating and outputting section 76 (step S4).

Figure 6B:
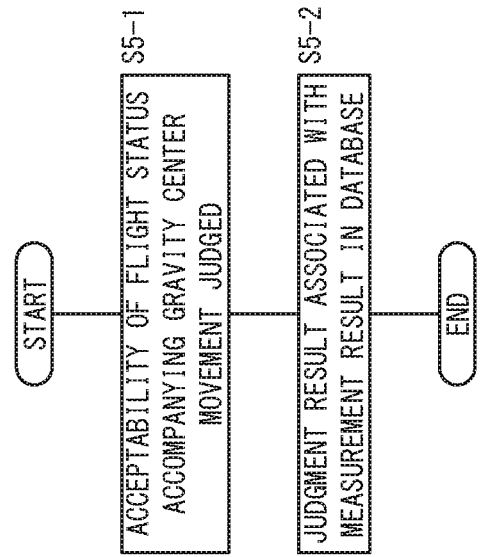
FIG. 6B is a flow chart showing the judgment accumulation process of FIG. 5.
Figure 6A:
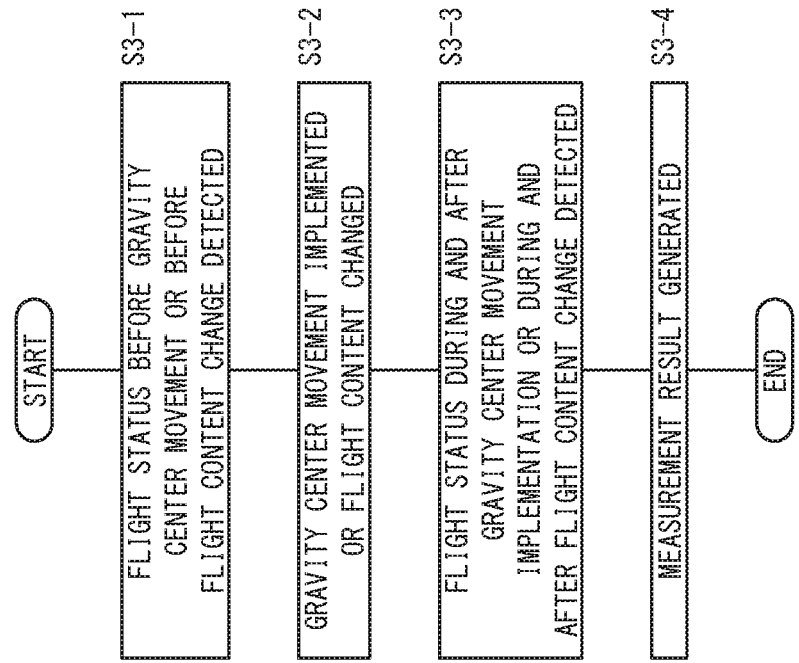
FIG. 6A is a flow chart showing the measurement process of FIG. 5.

Upon receiving the measurement result MR transmitted by the drone 12, the inspection apparatus 14 performs a judgment accumulation process on this measurement result MR (step S5). In this judgment accumulation process, the process flow shown in FIG. 6B is implemented.

Specifically, if gravity center movement is performed during the flight of the drone 12, based on the measurement result MR, the flight status judging section 90 of the inspection apparatus 14 judges whether this flight status is acceptable or unacceptable (step S5-1). Also, if the flight situation is changed during the gravity center movement of the gravity center movement apparatus 50, the flight status judging section 90 judges whether this flight status is acceptable or unacceptable in the same manner.

The data accumulating section 92 of the inspection apparatus 14 then stores the judgement result of step S5-1 in the memory in association with the flight command FC, the gravity center movement command GC, the received measurement result MR, and the like (step S5-2). At this time, the inspection apparatus 14 enters the flight status of the drone 12 accompanying the gravity center movement into a database and stores this database.

In the manner described above, with the flight status inspection system 10, the flight status inspection method, and the non-transitory computer-readable recording medium storing the program according to the present embodiment, the inspection apparatus 14 acquires and stores information (measurement result MR) concerning the flight status of the drone 12 when movement of the total gravity center position is implemented during the flight of the drone 12, or when the flight content is changed during the gravity center movement of the drone 12. In this way, it is possible to measure the flight status that accompanies the gravity center movement of the drone 12. In other words, by having the drone 12 perform the gravity center movement, it is possible to simulate various flight environments such as changes in the gravity centers of loaded objects and changes in posture caused by external disturbances. As a result, in a test or the like of the flight status of the drone 12, it is possible to implement an inspection in accordance with the actual situation and intended purpose, and to encourage the improvement of the development efficiency, safety, and the like of the drone 12.

As an example, in a case where the drone 12 planned for development is a boarding type onto which a person boards, even if a person is not actually boarded thereon, it is possible to inspect the flight status of the drone 12 in a situation equivalent to a case where a person is boarded thereon (posture change caused by body weight movement or the like). Alternatively, in a case where the drone 12 planned for development is a loading type onto which heavy objects (baggage) are loaded, even if heavy objects are not actually loaded thereon, it is possible to inspect the flight status of the drone 12 in a situation equivalent to a case where heavy objects are loaded thereon (gravity center position change caused by movement of the baggage or the like).

By making the drone 12 and the inspection apparatus 14 separate from each other, the flight status inspection system 10 can favorably inspect the flight status of the drone 12 while avoiding the impact caused by the drone 12 landing, contacting the inspection apparatus 14, or the like. Furthermore, since the inspection apparatus 14 acquires the information concerning the flight status of the drone 12 that has operated, according to the flight command FC and/or the gravity center movement command GC, it is possible to simplify the handling, checking, and the like of the inspection data by storing the measurement results MR and the command content in association with each other.

The inspection apparatus 14 of the flight status inspection system 10 performs measurement before the total gravity center position is moved during flight of the drone 12 or before the flight content is changed during the gravity center movement of the drone 12, to acquire the pre-implementation data. In this way, it is possible to utilize the pre-implementation data to favorably inspect the flight status.

Furthermore, the inspection apparatus 14 of the flight status inspection system 10 performs measurement during and/or after the movement of the total gravity center position is implemented during flight of the drone 12, or during and/or after changing of the flight content during the gravity center movement of the drone 12, to acquire the post-implementation data. In this way, it is possible to reliably inspect the flight status that accompanies the gravity center movement of the drone 12.

Yet further, by judging the acceptability of the flight status of the drone 12 with the flight status judging section 90 of the inspection apparatus 14, the flight status inspection system 10 can simplify the examination of the data and further improve the usability.

In particular, by including at least one of the posture, position, acceleration, and velocity of the drone 12 during flight in the information (measurement result MR) concerning the flight status, the flight status inspection system 10 can sufficiently inspect the flight status of the drone 12.

Second Embodiment

Figure 7:
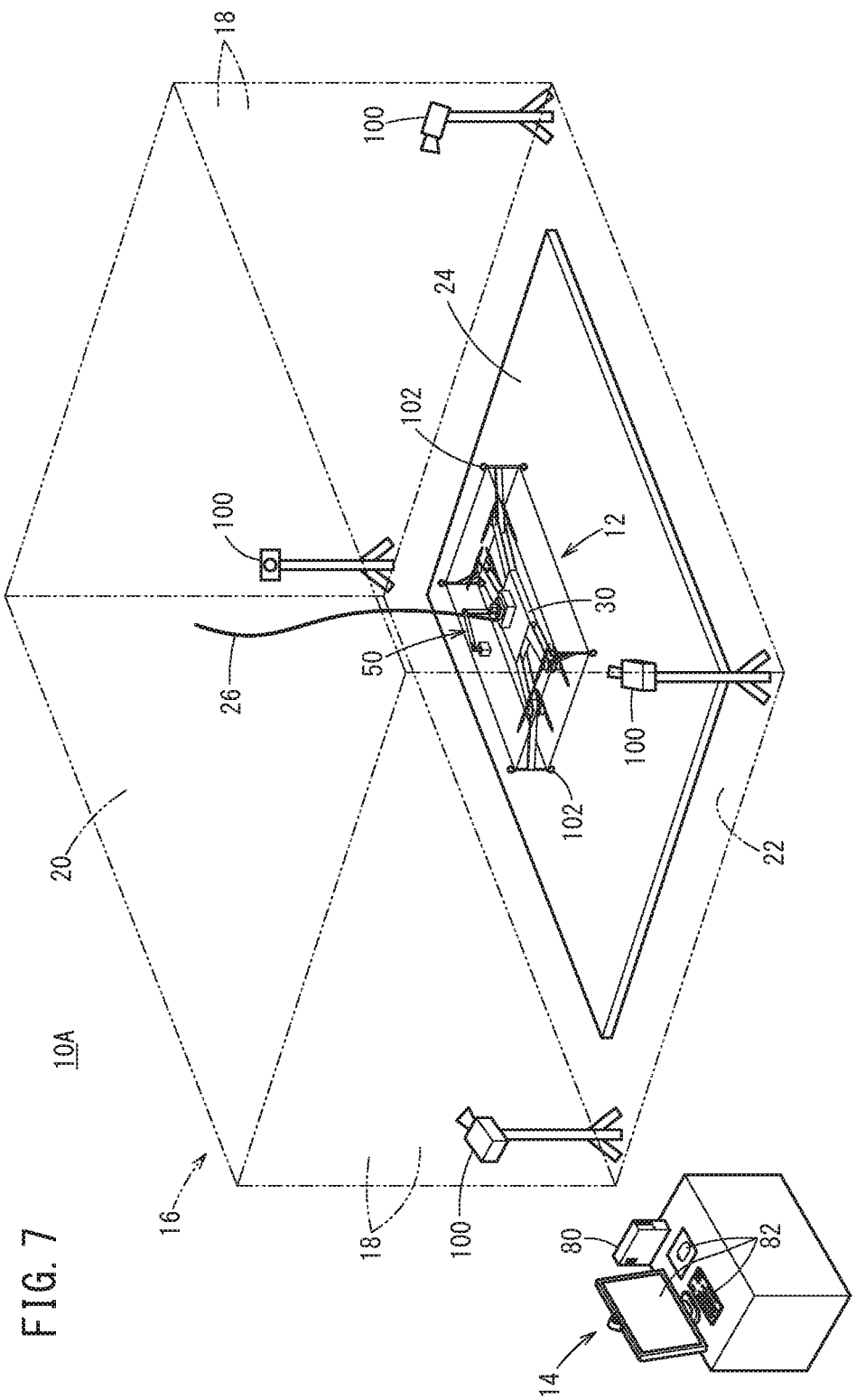
FIG. 7 is a perspective view schematically showing the overall configuration of a flight status inspection system according to a second embodiment of the present invention.
Figure 8:
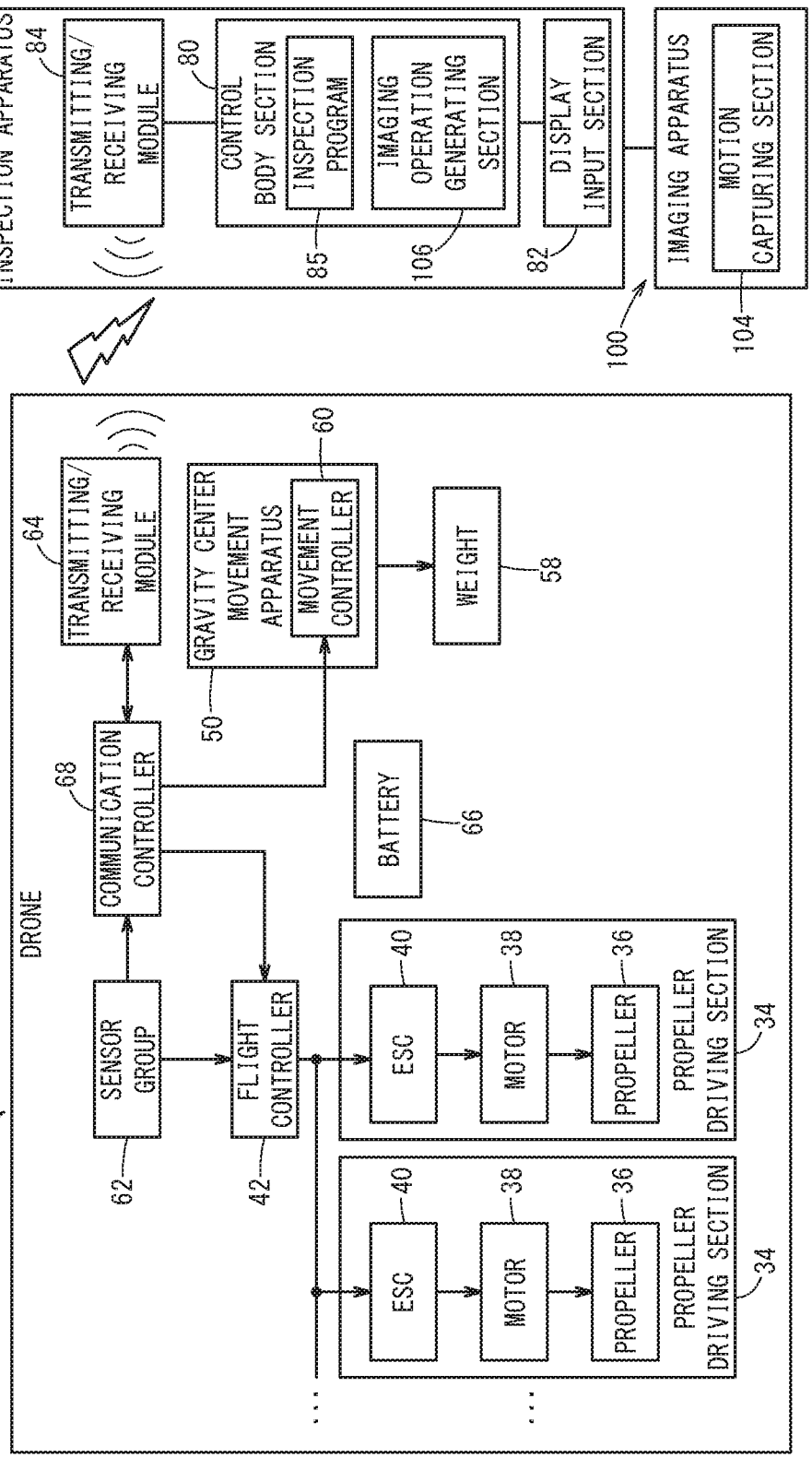
FIG. 8 is a block diagram showing the configuration of each of an inspecting section and the flying body of FIG. 7.

As shown in FIGS. 7 and 8, a flight status inspection system 10A according to the second embodiment differs from the flight status inspection system 10 according to the first embodiment by being provided with an imaging apparatus 100 that captures an image of the drone 12 in the planned flight space 16 of the drone 12. In the following description, elements having the same configurations or functions as those in the embodiment described above are given the same reference numerals, and detailed descriptions thereof are omitted.

Furthermore, in the flight status inspection system 10A, markers 102 assisting with the image capturing by the imaging apparatus 100 are provided on the drone 12. For example, the markers 102 are fixed at the eight corners (one marker at each of the top and bottom positions of each of the bars 46 at the four corners) on the rectangular drone 12. The flight status inspection system 10A may process video captured by the imaging apparatus 100 and perform a process to extract the drone 12 from the background of the video, in which case the drone 12 does not need to include the markers 102.

The imaging apparatus 100 that captures an image of the drone 12 is provided at each of the four corners of the planned flight space 16, for example, facing toward a substantially central portion of the planned flight space 16. Each imaging apparatus 100 includes a motion capturing section 104 that digitally records motion of the drone 12. Each motion capturing section 104 extracts the markers 102 captured in image frame units in accordance with the image capturing of the drone 12.

Furthermore, the control body section 80 of the inspection apparatus 14 includes an imaging operation generating section 106 that acquires extraction information of the markers 102 captured by the respective imaging apparatuses 100, continuously matches the markers 102 captured by the imaging apparatuses 100 at different imaging positions, and generates the operation of the drone 12 in a three-dimensional space. The imaging operation generating section 106 extracts the flight status (posture, position, acceleration, velocity, and the like) of the drone 12 in the planned flight space 16 as a measurement result MR, based on the generated three-dimensional operation of the drone 12.

The imaging operation generating section 106 may be provided in a computer separate from the inspection apparatus 14, and the inspection apparatus 14 may be configured to acquire the flight status from this computer. Furthermore, it is obvious that the number of imaging apparatuses 100 installed, the arrangement of the imaging apparatuses 100, and the like may be set arbitrarily.

Accordingly, the inspection apparatus 14 can perform the judgment accumulation process in the same manner as the first embodiment, using the gravity center movement command GC and the measurement results MR of the imaging operation generating section 106. Specifically, it is possible to perform the acceptability judgment of the flight state that accompanies the gravity center movement of the drone 12 and to enter these judgment results into a database, based on the measurement results MR of the imaging operation generating section 106.

Alternatively, the inspection apparatus 14 may be configured to acquire the measurement results MR of the imaging operation generating section 106 and the measurement results MR transmitted by the drone 12 (communication controller 68), and perform a process for comparing and correcting the posture, position, acceleration, velocity, and the like of the drone 12. In this way, the flight status of the drone 12 can be measured even more accurately.

In the manner described above, in the flight status inspection system 10A according to the second embodiment as well, it is possible to favorably measure the flight status including the gravity center movement of the drone 12, by using the imaging apparatuses 100. In particular, since the imaging apparatuses 100 are installed on the floor 22 or the like separately from the drone 12, the imaging apparatuses 100 are not affected by shaking of the drone 12, and it is possible to significantly reduce the detection error of the posture, position, and the like of the drone 12.

The present invention is not limited to the embodiments described above, and various alterations can be made within the scope of the present invention. For example, in the embodiments described above, the drone 12 and the inspection apparatus 14 are formed separately, but the present invention is not limited to this, and an inspecting section (having the same function as the inspection apparatus 14) may be provided inside the drone 12.

Furthermore, the inspection apparatus 14 may have a configuration in which the flight status judging section 90 is not included and the flight status accompanying the gravity center movement is simply measured (acquired and stored). Furthermore, some or all of the inspection apparatus 14 may be realized by cloud computing.

What is claim is:

1. A flight status inspection system comprising:
a flying body capable of flying through air; and
an inspection apparatus that inspects a flight status of the flying body, wherein
the inspection apparatus includes:
one or more first computers, and
a first transmitting/receiving module that is capable of performing information communication with an outside,
the flying body includes:
one or more second computers,
a second transmitting/receiving module that is capable of performing information communication with the outside,
a gravity center movement apparatus configured to move a gravity center position of the overall flying body, and
one or more sensors that detect the flight status of the flying body,
the first transmitting/receiving module and the second transmitting/receiving module are connected in a manner that enables wired or wireless communication between the first transmitting/receiving module and the second transmitting/receiving module, and
the one or more first computers
generate, as a flight command, information concerning flight content of the flying body and transmit the generated flight command to the flying body via the first transmitting/receiving module,
generate, as a gravity center movement command, information concerning movement content of the gravity center movement apparatus and transmit the generated gravity center movement command to the flying body via the first transmitting/receiving module, and
receive, via the first transmitting/receiving module, a measurement result transmitted from the flying body and judge acceptability of the flight status of the flying body based on the measurement result,
the one or more second computers
receive, via the second transmitting/receiving module, the flight command transmitted from the inspection apparatus and cause the flying body to fly based on the flight command,
receive, via the second transmitting/receiving module, the gravity center movement command transmitted from the inspection apparatus and cause the gravity center movement apparatus to operate based on the gravity center movement command, and
extract detection information concerning the flight status detected by the one or more sensors, generate the measurement result, and transmit the generated measurement result to the inspection apparatus via the second transmitting/receiving module,
the measurement result contains information concerning the flight status of when flight content is changed during gravity center movement of the flying body.

2. The flight status inspection system according to claim 1, wherein
the one or more second computers acquire from the one or more sensors the information concerning the flight status before the flight content is changed during the gravity center movement of the flying body.

3. The flight status inspection system according to claim 1, wherein
the one or more second computers acquire from the one or more sensors the information concerning the flight status during and/or after changing of the flight content during the gravity center movement of the flying body.

4. The flight status inspection system according to claim 1, wherein
the first computers judge whether a prescribed value included in the information concerning the flight status is within a predetermined tolerable range, based on the information concerning the flight status, the information being acquired from the flying body.

5. The flight status inspection system according to claim 1, wherein
the information concerning the flight status includes at least one of a posture, a position, an acceleration, and a velocity of the flying body during flight.

6. A flight status inspection method comprising:
inspecting, by one or more first computers and a first transmitting/receiving module, a flight status of a flying body capable of flying through air, wherein the first transmitting/receiving module is capable of performing information communication with an outside, and wherein
the flying body includes
one or more second computers,
a second transmitting/receiving module capable of performing information communication with the outside,
a gravity center movement apparatus configured to move a gravity center position of the overall flying body, and
one or more sensors that detect the flight status of the flying body,
the first transmitting/receiving module and the second transmitting/receiving module are connected in a manner that enables wired or wireless communication between the first transmitting/receiving module and the second transmitting/receiving module,
the method further comprising:
generating, by the one or more first computers, as a flight command, information concerning flight content of the flying body;
transmitting, by the first transmitting/receiving module, the generated flight command to the flying body;
generating, by the one or more first computers, as a gravity center movement command, information concerning movement content of the gravity center movement apparatus; and
transmitting, by the first transmitting/receiving module, the generated gravity center movement command to the flying body;
receiving, by the first transmitting/receiving module, a measurement result transmitted from the flying body; and
judging, by the one or more first computers, acceptability of the flight status of the flying body based on the measurement result,
wherein the method further comprises:
receiving, by the second transmitting/receiving module, the flight command;
causing, by the one or more second computers, the flying body to fly based on the flight command;
receiving, by the second transmitting/receiving module, the gravity center movement command;
causing, by the one or more second computers, the gravity center movement apparatus to operate based on the gravity center movement command;

extracting, by the one or more second computers, detection information concerning the flight status detected by the one or more sensors;

generating, by the one or more second computers, the measurement result; and transmitting, by the second transmitting/receiving module, the generated measurement result, the measurement result contains information concerning the flight status of when flight content is changed during gravity center movement of the flying body.

7. A non-transitory computer-readable recording medium storing a program for an inspection apparatus that inspects a flight status of a flying body capable of flying through air, wherein the program causes the inspection apparatus to inspect the flight status of the flying body, wherein the inspection apparatus includes:
one or more first computers, and
a first transmitting/receiving module that is capable of performing information communication with an outside, the flying body includes:
one or more second computers,
a second transmitting/receiving module that is capable of performing information communication with the outside,
a gravity center movement apparatus configured to move a gravity center position of the overall flying body, and
one or more sensors that detect the flight status of the flying body, the first transmitting/receiving module and the second transmitting/receiving module are connected in a manner that enables wired or wireless communication between the first transmitting/receiving module and the second transmitting/receiving module, and wherein the program causes the one or more first computers to:
generate, as a flight command, information concerning flight content of the flying body and transmit the generated flight command to the flying body via the first transmitting/receiving module,
generate, as a gravity center movement command, information concerning movement content of the gravity center movement apparatus and transmit the generated gravity center movement command to the flying body via the first transmitting/receiving module, and
receive, via the first transmitting/receiving module, a measurement result transmitted from the flying body and judge acceptability of the flight status of the flying body based on the measurement result, wherein the program causes the one or more second computers
receive, via the second transmitting/receiving module, the flight command transmitted from the inspection apparatus and cause the flying body to fly based on the flight command,
receive, via the second transmitting/receiving module, the gravity center movement command transmitted from the inspection apparatus and cause the gravity center movement apparatus to operate based on the gravity center movement command, and
extract detection information concerning the flight status detected by the one or more sensors, generate the measurement result, and transmit the generated measurement result to the inspection apparatus via the second transmitting/receiving module, the measurement result contains information concerning the flight status of when flight content is changed during gravity center movement of the flying body.

* * * * *